(12) United States Patent
Jung et al.

(10) Patent No.: US 7,653,247 B2
(45) Date of Patent: Jan. 26, 2010

(54) SYSTEM AND METHOD FOR EXTRACTING CORNER POINT IN SPACE USING PIXEL INFORMATION, AND ROBOT USING THE SYSTEM

(75) Inventors: Myung-Jin Jung, Suwon-si (KR);
Dong-Ryeol Park, Hwaseong-si (KR);
Seok-Won Bang, Seoul (KR);
Hyoung-Ki Lee, Suwon-Si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 762 days.

(21) Appl. No.: 11/237,660

(22) Filed: Sep. 29, 2005

(65) Prior Publication Data
US 2006/0083427 A1     Apr. 20, 2006

(30) Foreign Application Priority Data
Oct. 15, 2004     (KR)     .................. 10-2004-0082646

(51) Int. Cl.
*G06K 9/46*     (2006.01)
*G06K 9/00*     (2006.01)
*G06F 19/00*     (2006.01)

(52) U.S. Cl. .................. 382/201; 382/153; 382/190; 700/245

(58) Field of Classification Search .................. 382/153, 382/190, 201; 701/245
See application file for complete search history.

(56) References Cited

U.S. PATENT DOCUMENTS

| 4,119,900 | A  | * | 10/1978 | Kremnitz ..................... 701/23 |
| 4,969,036 | A  | * | 11/1990 | Bhanu et al. ................. 348/113 |
| 7,162,056 | B2 | * | 1/2007  | Burl et al. .................... 382/104 |
| 7,539,563 | B2 | * | 5/2009  | Yang et al. ................... 701/24 |
| 2003/0086613 | A1 | * | 5/2003 | Kaneko et al. ............... 382/190 |
| 2004/0247174 | A1 | * | 12/2004 | Lyons et al. ................ 382/154 |
| 2006/0083427 | A1 | * | 4/2006 | Jung et al. ................... 382/201 |
| 2006/0182365 | A1 | * | 8/2006 | Park et al. .................... 382/261 |

(Continued)

OTHER PUBLICATIONS

Hartmut Surmann, Andreas Nuchter, Joachim Hertzberg, An autonomous mobile robot with a 3D laser range finder for 3D exploration and digitalization of indoor environments, Robotics and Autonomous Systems, vol. 45, Issues 3-4, Dec. 31, 2003, pp. 181-198, ISSN 0921-8890, DOI: 10.1016/j.robot.2003.09.004. (http://www.sciencedirect.com/science/ar.*

(Continued)

*Primary Examiner*—Bhavesh M Mehta
*Assistant Examiner*—Gandhi Thirugnanam
(74) *Attorney, Agent, or Firm*—Staas & Halsey LLP

(57) ABSTRACT

A system and method for extracting a corner point in a space using pixel information obtained from a camera are provided. The corner point extracting system includes a light generation module emitting light in a predetermined form (such as a plane form), an image acquisition module acquiring an image of a reflector reflecting the light emitted from the light generation module, and a control module obtaining distance data between the light generation module and the reflector using the acquired image and extracting a corner point by performing split-merge using a threshold proportional to the distance data. The threshold is a value proportional to the distance data which corresponds to pixel information of the image acquisition module.

19 Claims, 14 Drawing Sheets

U.S. PATENT DOCUMENTS

2008/0008353 A1* 1/2008 Park et al. .................. 382/103

OTHER PUBLICATIONS

Borges, G.A.; Aldon, M.-J., "A split-and-merge segmentation algorithm for line extraction in 2D range images," Pattern Recognition, 2000. Proceedings. 15th International Conference on, vol. 1, No., pp. 441-444 vol. 1, 2000.*

Pavlidis, T.; Horowitz, S.L., "Segmentation of Plane Curves," Computers, IEEE Transactions on, vol. C-23, No. 8, pp. 860-870, Aug. 1974.*

Li, Zhilin, "An Examination of Algorithms for the Detection of Critical Points on Digital Cartographic Lines", The Cartographic Journal, vol. 32 pp. 121-125, Dec. 1995.*

Jiang, X.Y.; Bunke, H. "Fast Segmentation of Range Images into Planar Regions by Scan Line Grouping"; "Machine Vision and Applications" p. 1-23, 1994.*

K.S. Fu, R.C. Gonzalez, C.S.G. Lee, "Robotics: Control, Sensing, Vision, and Intelligence" pp. 268-273, 1987.

Yoshiaki Shirai, "Recognition of Polyhedrons with a Rage Finder"; Pergamon Press, 1972, vol. 4, pp. 243-250.

R.J. Popplestone, C.M. Brown, A.P. Ambler, G.F. Crawford, "Forming Model of Plane and Cylinder Faceted Bodies form Light Stripes", British Library, pp. 664-668, 1975.

* cited by examiner

SYSTEM AND METHOD FOR EXTRACTING CORNER POINT IN SPACE USING PIXEL INFORMATION, AND ROBOT USING THE SYSTEM

CROSS-REFERENCE TO RELATED APPLICATIONS

This application claims the benefit of Korean Patent Application No. 10-2004-0082646 filed on Oct. 15, 2004 in the Korean Intellectual Property Office, the disclosure of which is incorporated herein by reference.

BACKGROUND OF THE INVENTION

1. Field of the Invention

The present invention relates to a system and method for extracting a corner point, and more particularly, to a system and method for extracting a corner point from an object in a space using pixel information obtained from an image acquisition device such as a camera.

2. Description of the Related Art

As recognition ability and determination ability have been added to a robot used in industrial sites to perform simple assembling or processes, the robot has been enabled to perform more advanced functions.

Moreover, unlike a stationary robot fixed in a certain place or installed in a preconfigured work environment, a mobile robot that can move by itself can be used in an extended work area such as an arbitrary work place or an outdoor place. Accordingly, the mobile robot is superior to the stationary robot since the mobile robot can play more various roles and perform more various tasks.

Robots are being used today to perform tasks in places such as the deep sea and nuclear power plants which are dangerous and difficult to approach for humans. Mobile robots need to have abilities to autonomously set a work path, detect obstacles, and avoid collision to move and perform tasks in places satisfactory information on which cannot be obtained in advance Recently, simultaneous localization and mapping (SLAM) used by a robot to automatically build up a map within an unknown environment while at the same time keeping track of its current position has been researched and developed.

To perform SLAM, a mobile robot must have a function that extracts information usable to localization from an ambient environment.

To extract information, many methods using a visual sensor, an ultrasonic sensor, or a contact sensor have been used. In particular, a method using a visual sensor using a structured light such as a laser beam and a camera and a three-dimensional recognition algorithm is very effective since it does not require a burden of calculation and can be used in a place with rapid change in brightness.

In the method, light is emitted to an object in a predetermined form using an active vision system like a laser, and an image is acquired using a sensor like a camera. Thereafter, when a laser reflection point is captured in the image, a distance between a point from which a laser beam is emitted (referred to as a laser emission point) and the laser reflection point is calculated using a triangulation involving camera image coordinates of the captured point, a scanning angle at the moment of capturing, and a distance between the camera and the laser emission point. In the triangulation, a relationship among the laser emission point, the laser reflection point, and the distance between the laser emission point and the camera is converted into a geometrical, i.e., triangular, relationship to obtain a distance. The detailed description thereof is disclosed in the following reference "K. S. Fu, R. C. Gonzalez, and C. S. G. Lee, *Robotics: Control, Sensing, Vision, and Intelligence*, McGraw-Hill, pp 268-273, 1987".

A method using the structured light is disclosed in the following reference 'Y. Shirai, "Recognition of Polyhedrons with a Range Finder", Pattern Recog, vol. 4, pp 243-250, 1972', 'R. J. Poppleston, C. M. Brown, A. P. Ambler, and G. F. Crawford, "Forming Model of Plane and Cylinder Faceted Bodies from Light Stripes", Proc. Int. Joint Cont. Artificial Intell., pp 629-673, 1975'.

After obtaining distance data between the laser emission point and the laser reflection point, split-merge is performed on the distance data to extract a corner point which is important information used to localize a mobile robot.

FIG. 1 illustrates a conventional split-merge method.

In FIG. 1, a Z-direction is a direction of the distance from the laser emission point to an obstacle, i.e., a reflector that reflects a laser beam. Each point corresponds to distance data.

On a coordinate plane 100, two end points 110 and 112 are selected and a line 114 connecting the two end points 110 and 112 is obtained. Next, a distance between the line 114 and each point is measured. If the measured distance exceeds a predetermined threshold, a split occurs at the point.

For example, when a distance between a point 116 and the line 114 exceeds the predetermined threshold, as shown on a coordinate plane 120, two lines 122 and 124 from the point 116 to opposite end points are generated. Next, similarly to the above-described operation, a distance between each of the lines 122 and 124 and each point is measured and it is determined whether the measured distance exceeds a predetermined threshold.

If points 130 and 132 are located at a distance exceeding the predetermined threshold from the lines 122 and 124, a split occurs at each of the points 130 and 132. As a result, on a coordinate plane 140, four lines 142, 144, 146, and 148 appear. Next, a distance between each of the lines 142, 144, 146, and 148 and each point is measured and it is determined whether the measured distance exceeds a predetermined threshold. When there is no measured distance exceeding the predetermined threshold, splitting ends and merging begins.

In the merge, when any distance between continuous lines and each of points near the continuous lines does not exceed a predetermined threshold, a common line to the continuous lines is created.

For example, on a coordinate plane 160, a common line 162 to the lines 144 and 146 is created.

When split-merge is performed as illustrated in FIG. 1, corner points can be obtained from finally created lines. Here, the threshold used during the split-merge is usually proportional to the distance between the laser emission point and the laser reflection point. However, in this case, a corner may not be detected.

FIGS. 2A through 2C illustrate the extraction result of corner points using the above-described conventional split-merge method.

Referring to FIG. 2A, distance data are divided into two groups, i.e, group A and group B. Referring to FIG. 2B, splitting is performed on each group. However, the splitting is performed wrong. As a result, corner_0 is not detected as illustrated in FIG. 2C. This happens because the threshold is determined simply to be proportional to the distance between the laser emission point and the laser reflection point.

Therefore, to solve a problem that a corner point is not detected, a different method of determining a threshold is desired.

SUMMARY OF THE INVENTION

Additional aspects and advantages of the invention will be set forth in part in the description which follows and, in part, will be apparent from the description, or may be learned by practice of the invention.

The present invention provides a system and method of extracting a corner point in space by using pixel information in a camera in determining a threshold needed for split-merge.

According to an aspect of the present invention, a system extracting a corner point in a space using pixel information includes a light generation module emitting light in a predetermined form, an image acquisition module acquiring an image of a reflector reflecting the light emitted from the light generation module, and a control module obtaining distance data between the light generation module and the reflector using the acquired image and extracting the corner point by performing split-merge using a threshold proportional to the distance data. The threshold is a value proportional to the distance data corresponding to the pixel information of the image acquisition module.

In an aspect of the present invention, the predetermined form is a plane form.

According to another aspect of the present invention, a method of extracting a corner point includes emitting light to a reflector in a predetermined form, acquiring an image of the reflector reflecting the light, obtaining distance data between a light emission point and the reflector using the acquired image, and extracting a corner point by performing split-merge based on a threshold proportional to the distance data, wherein the threshold is a value proportional to the distance data which corresponds to pixel information of the acquired image.

In an aspect of the present invention, the predetermined form is a plane form.

According to still another aspect of the present invention, a mobile robot includes a corner point extracting system acquiring an image of a reflector which reflects light emitted thereto in a predetermined form and extracting a corner point using pixel information of the acquired image, a central control system determining a moving direction and speed based on a position of the extracted corner point, and a driving system moving the mobile robot according to the moving direction and speed determined by the central control system.

In an aspect of the present invention, the predetermined form is a plane form.

BRIEF DESCRIPTION OF THE DRAWINGS

These and other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
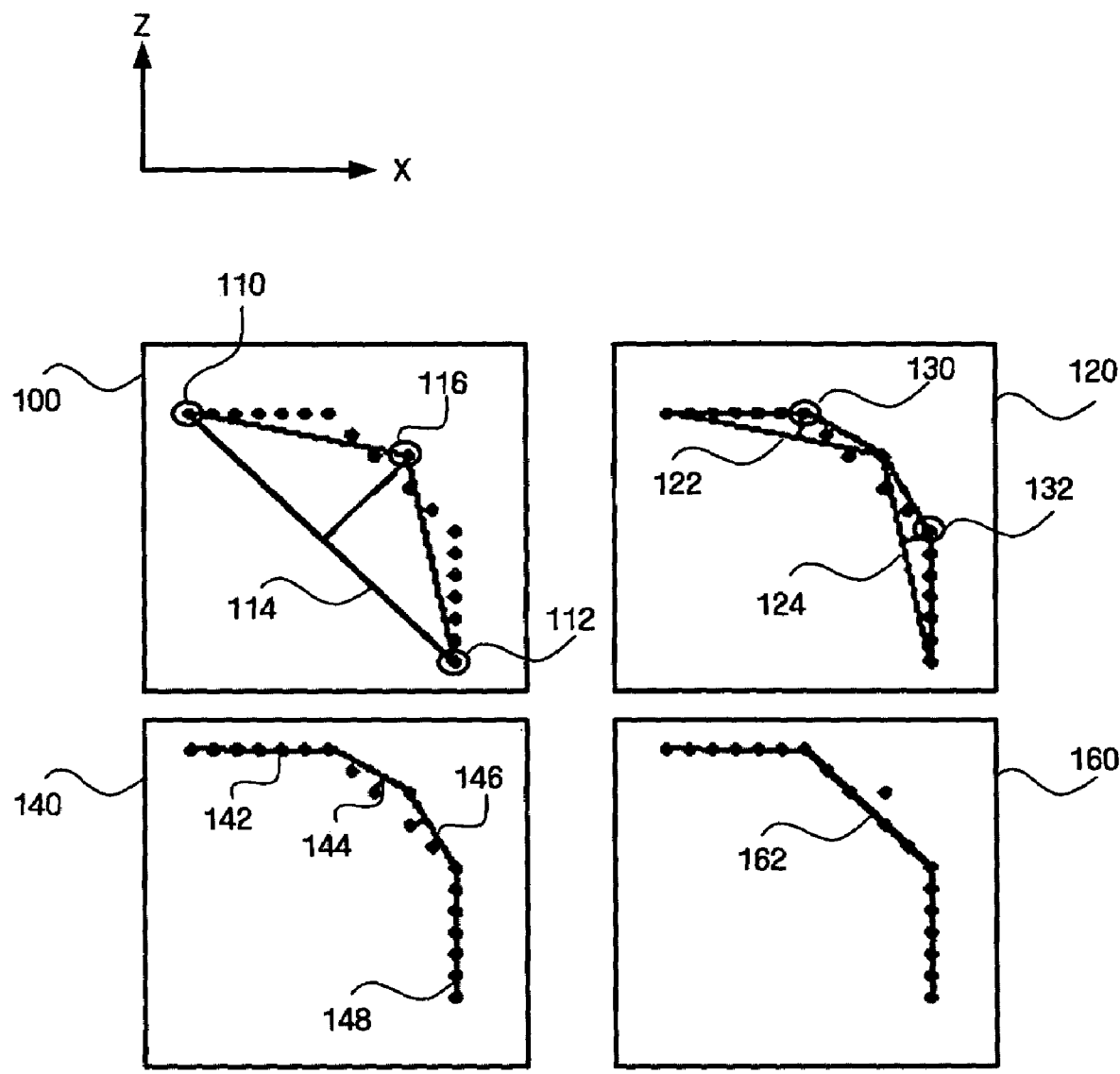
FIG. 1 illustrates a conventional split-merge method.

Reference will now be made in detail to the embodiments of the present invention, examples of which are illustrated in the accompanying drawings, wherein like reference numerals refer to the like elements throughout. The embodiments are described below to explain the present invention by referring to the figures.

A system and method for extracting a corner point according to the present invention will now be described more fully with reference to flowchart illustrations of methods according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block(s).

Figure 3:
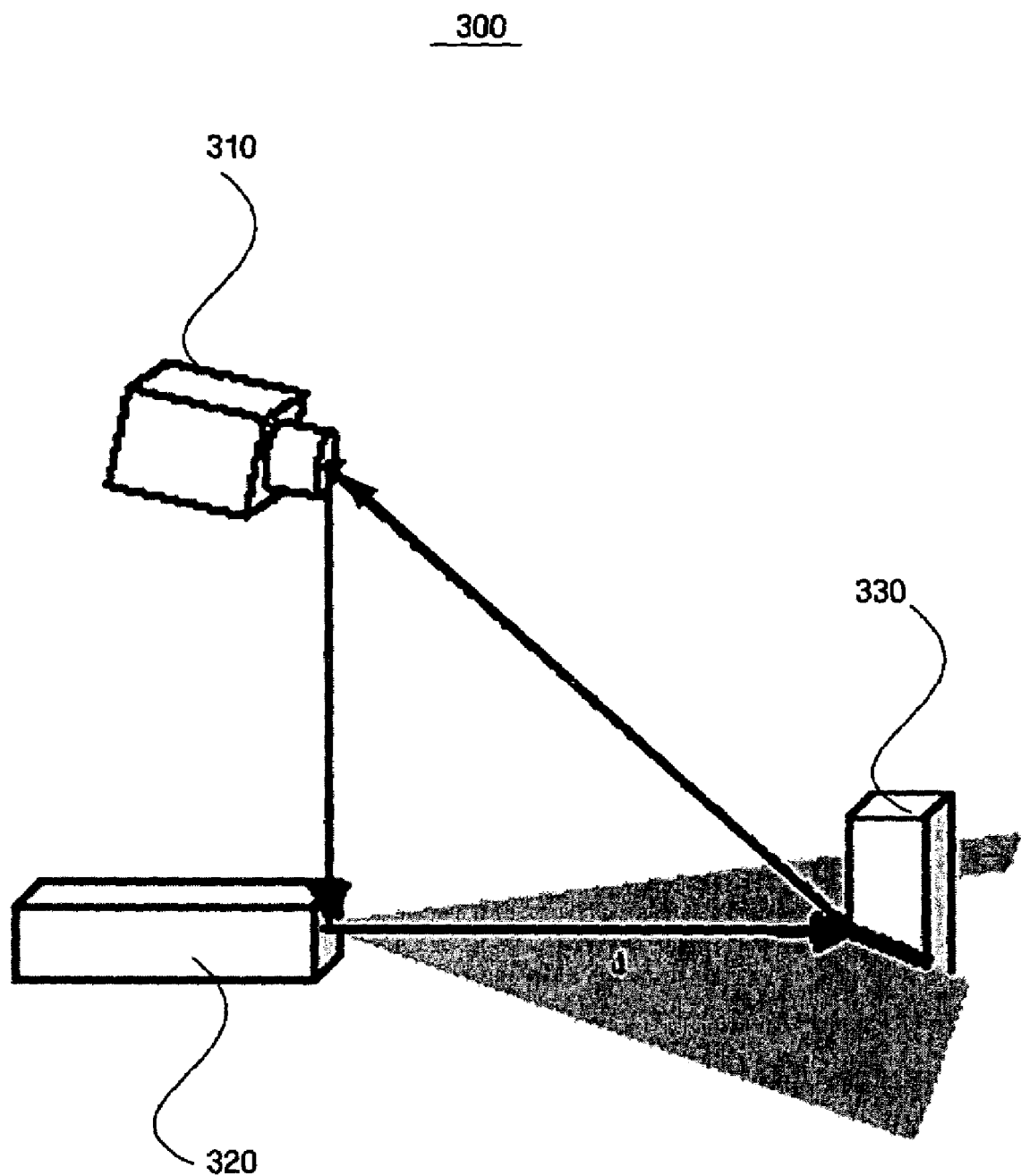
FIG. 3 illustrates a system for extracting a corner point according to the present invention.

FIG. 3 illustrates a system 300 for extracting a corner point according to the present invention.

The system 300 may be installed in a mobile robot to recognize an object and avoid collision. A light generator 320 emits light such as a laser beam to an obstacle (or a reflector) 330 in a predetermined form. In an embodiment of the present invention, the predetermined form is a plane form. As shown in FIG. 1, the obstacle 330 is located a distance d from the light generator 320. An image reflected from the obstacle 330 is acquired by a camera 310.

Figure 4:
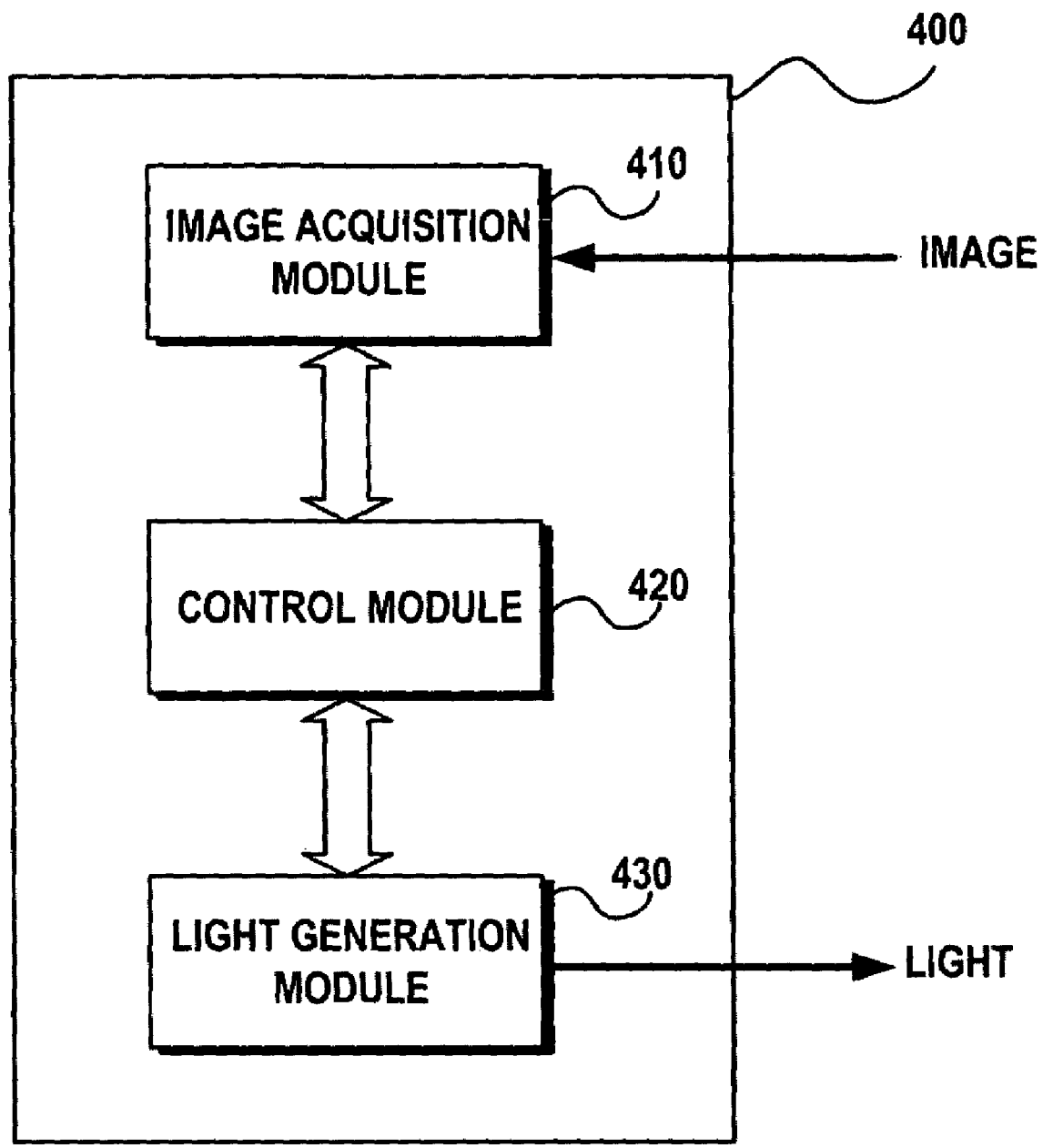
FIG. 4 is a block diagram of a system for extracting a corner point according to an embodiment of the present invention.

FIG. 4 is a block diagram of a system 400 for extracting a corner point according to an embodiment of the present invention. The system 400 includes an image acquisition module 410 such as the camera 310 acquiring an image, a light generation module 430 corresponding to the light generator 320, and a control module 420.

The term 'module', as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The control module 420 obtains distance data between the light generator 320 and the obstacle (or the reflector) 330 using the image acquired by the image acquisition module 410 and a geometrical relationship among the light generator 320, the obstacle 330, and the camera 310. Thereafter, split-merge is performed to extract a corner point from the distance data using a threshold according to an embodiment of the present invention.

The control module 420 may be implemented as a device or software for processing a signal or a digital signal.

Figure 5:
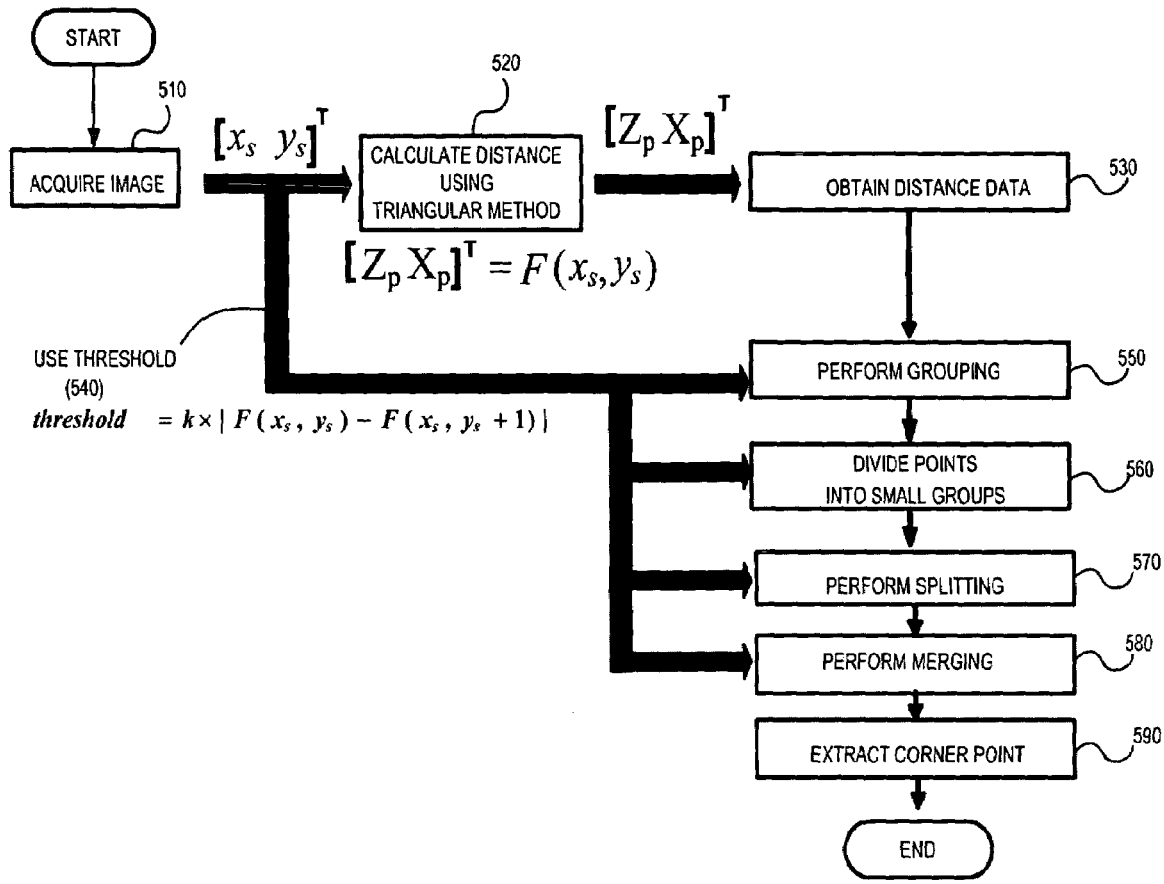
FIG. 5 is a flowchart of a method of extracting a corner point according to an embodiment of the present invention.

FIG. 5 is a flowchart of a method of extracting a corner point according to an embodiment of the present invention.

In operation 510, the light generation module 430 emits light on the obstacle (or the reflector) 330 shown in FIG. 3 and the image acquisition module 410 acquires an image of the obstacle 330.

Figure 6:
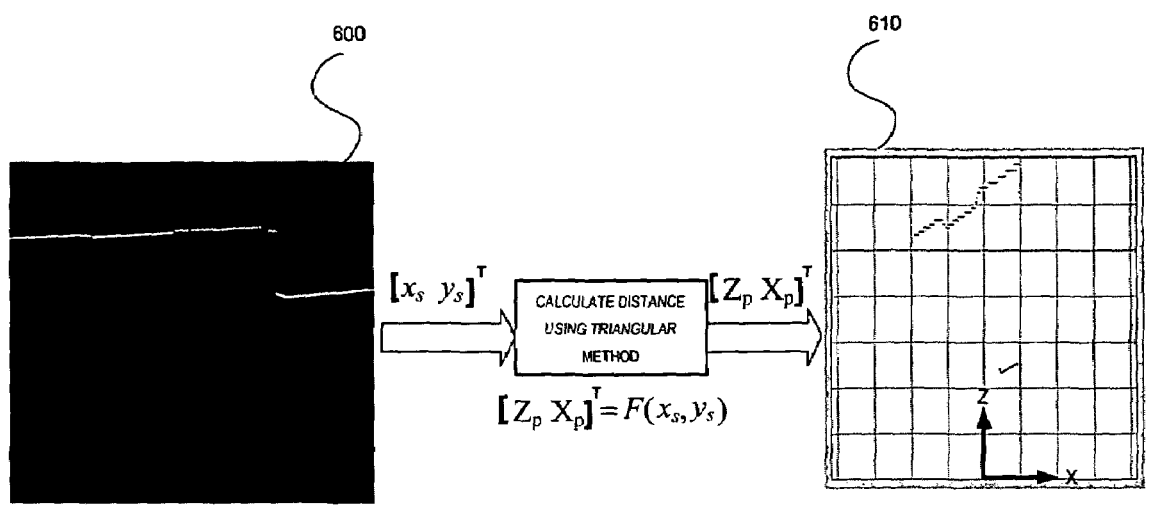
FIG. 6 illustrates a procedure for calculating distance data according to an embodiment of the present invention.

In operations 520 and 530, information on each of points in the acquired image is converted into a coordinate value on a plane according to distance calculation using a triangulation, thereby obtaining distance data. Here, the plane indicates a plane obtained when the light generator 320 and the obstacle 330 are viewed from above and is illustrated in FIG. 6. When a arbitrary coordinate value on an image 600 acquired by the image acquisition module 410 is represented by $[x_s\ y_s]^T$ and a transformation according to the triangulation is represented by F, a plane coordinate value 610 may be expressed as $[Z_p\ X_p]^T = F(x_s, y_s)$. Here, a Z-direction is a distance direction from a laser emission point to the obstacle, i.e., reflector 330 reflecting the light. $F(x_s, y_s)$ is defined as the following equation:

$$F(x_S, y_S) = \begin{bmatrix} Z_P \\ X_P \end{bmatrix} = \begin{bmatrix} PY \cdot \dfrac{-\sin\alpha \cdot (y_s - y_o) \cdot a + \cos\alpha}{\sin\alpha + \cos\alpha \cdot (y_s - y_o) \cdot a} \\ \dfrac{PY \cdot (x_s - x_o) \cdot b}{\sin\alpha + \cos\alpha \cdot (y_s - y_o) \cdot a} \end{bmatrix}$$

where $x_s$ and $y_s$ indicate a position of the center of an image (in pixel units), PY is a distance between a camera and a projector emitting laser light, $\alpha$ is an angle at which the camera is tilted, and "a" and "b" are constants related with a scale indicating a ratio between an image pixel unit and a spatial distance. The function F is a two-dimensional vector and uses addition, subtraction, and absolute value calculation which are applied to a normal two-dimensional vector.

In operation 550 and 560, the control module 420 groups adjacent points in the image based on the distance data to divide all points into a plurality of groups. Thereafter, conventional split-merge is performed in operation 570 and 580. As a result, a corner point can be extracted in operation 590.

Unlike in the conventional technology, in operation 540 a threshold is determined using pixel information obtained from the image acquisition module 410 such as a camera and used for operations 550 through 580.

As shown in FIG. 5, the threshold may be determined to be proportional to $|F(x_s, y_s) - F(x_s, y_s+1)|$ where $x_s$ and $y_s$ indicate arbitrary coordinates in the acquired image, $y_s+1$ is a coordinate shifted from the position $y_s$ by 1 pixel in a y-direction, and F(a, b) is a coordinate value on a new plane, e.g., the plane coordinate value 610, into which a coordinate value $[a\ b]^T$ is converted using the triangulation.

Figure 7:
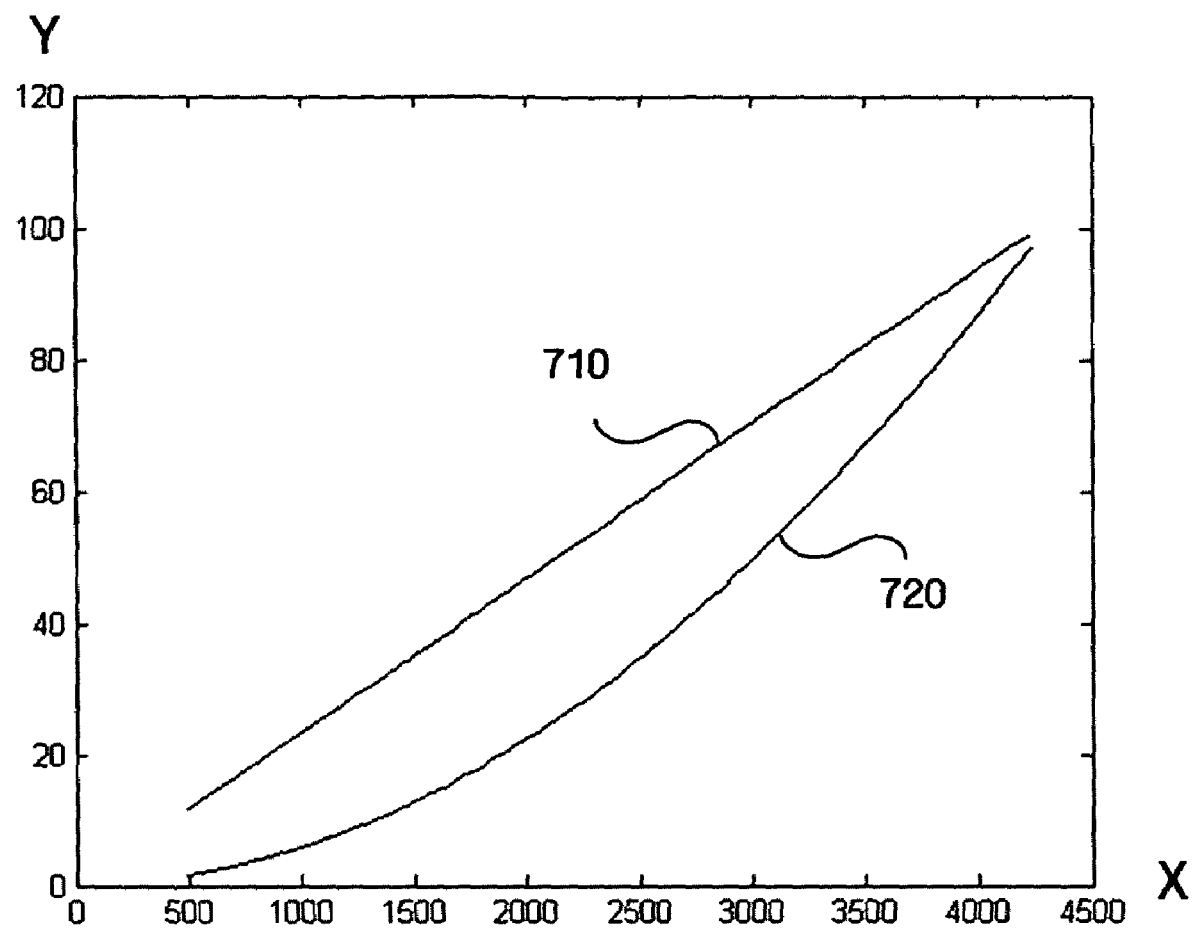
FIG. 7 is a graph of the distance between a light generator and a reflector versus a threshold in an embodiment of the present invention.

FIG. 7 is a graph of the distance between the light generator 320 and a reflector versus a threshold in an embodiment of the present invention. The X-axis is a distance from the light generator 320 to the reflector, which is expressed in unit of millimeters (mm), and the Y-axis is the threshold expressed in mm units.

Referring to FIG. 7, while a linear characteristic appears between the X-axis and the Y-axis in a graph 710 corresponding to the conventional technology, a non-linear characteristic appears therebetween in a graph 720 corresponding to the present invention.

FIGS. 8a through 8d are graphs illustrating an example of a procedure for extracting a corner point according to the present invention.

Figure 2A:
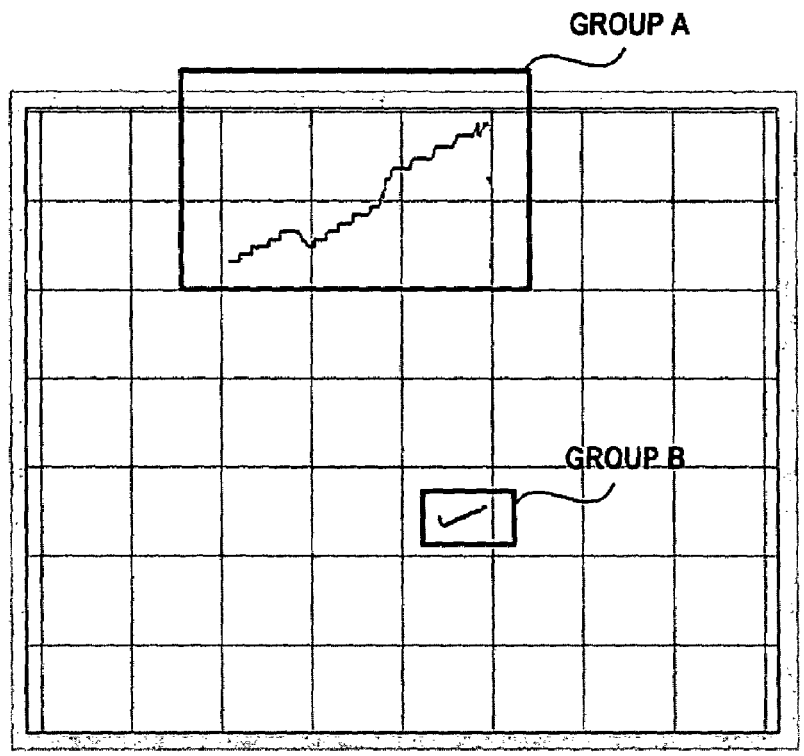
FIGS. 2A through 2C are graphs showing an extraction result of corner points using the conventional split-merge method shown in FIG. 1.
Figure 2B:
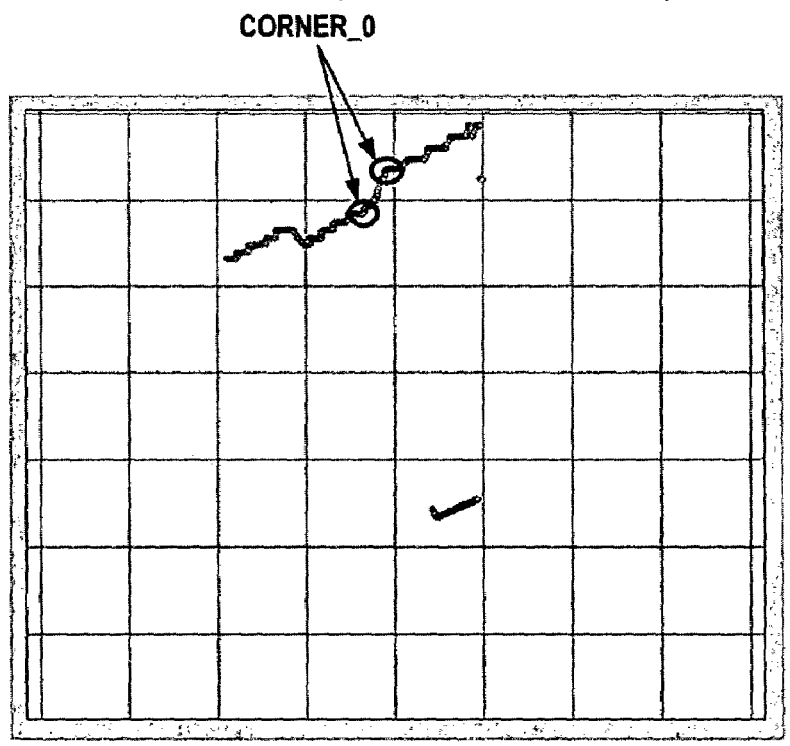
Figure 2C:
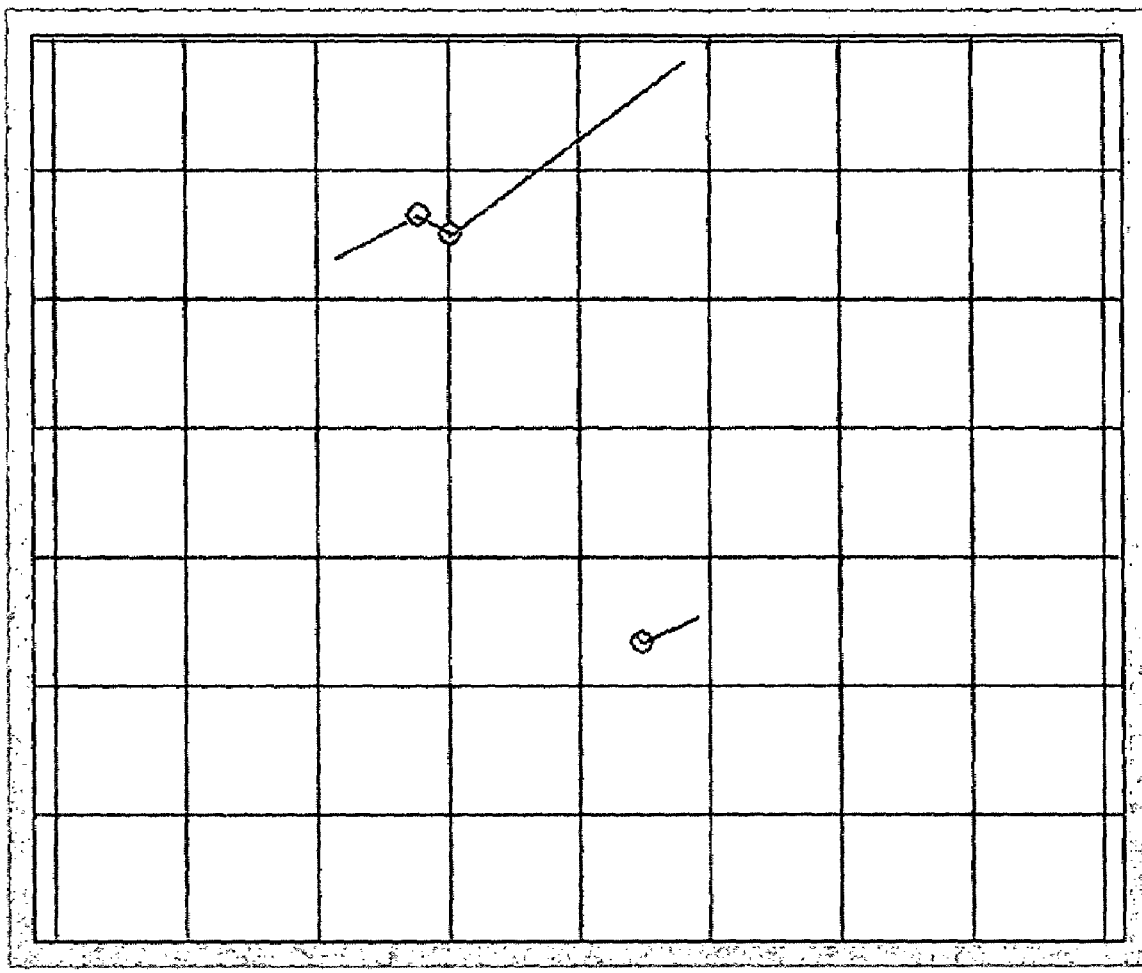
Figure 8A:
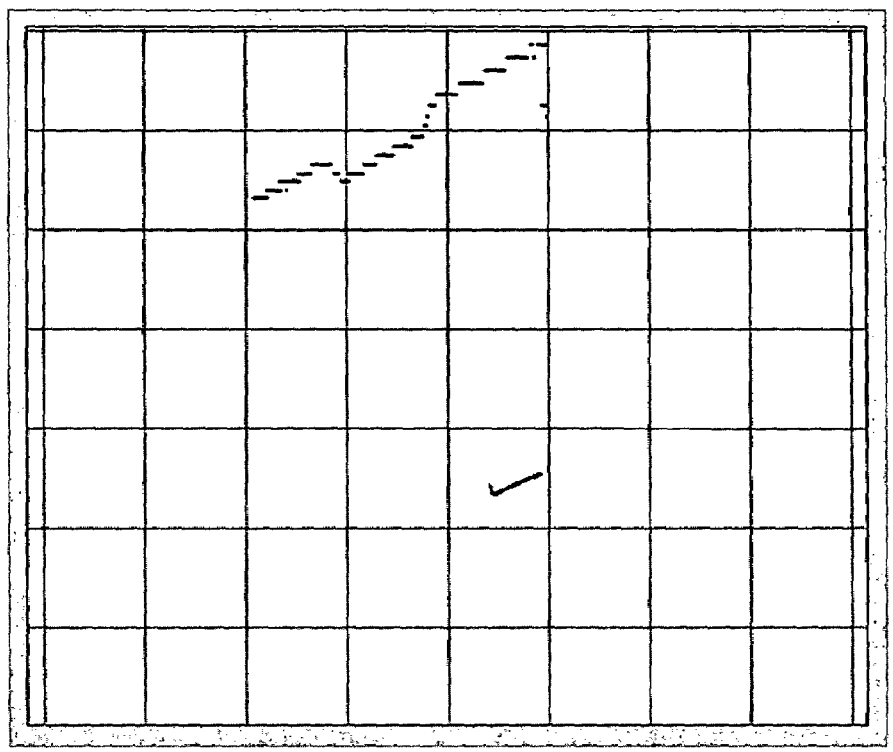
FIGS. 8a through 8d are graphs showing an example of a procedure for extracting a corner point according to the present invention.
Figure 8B:
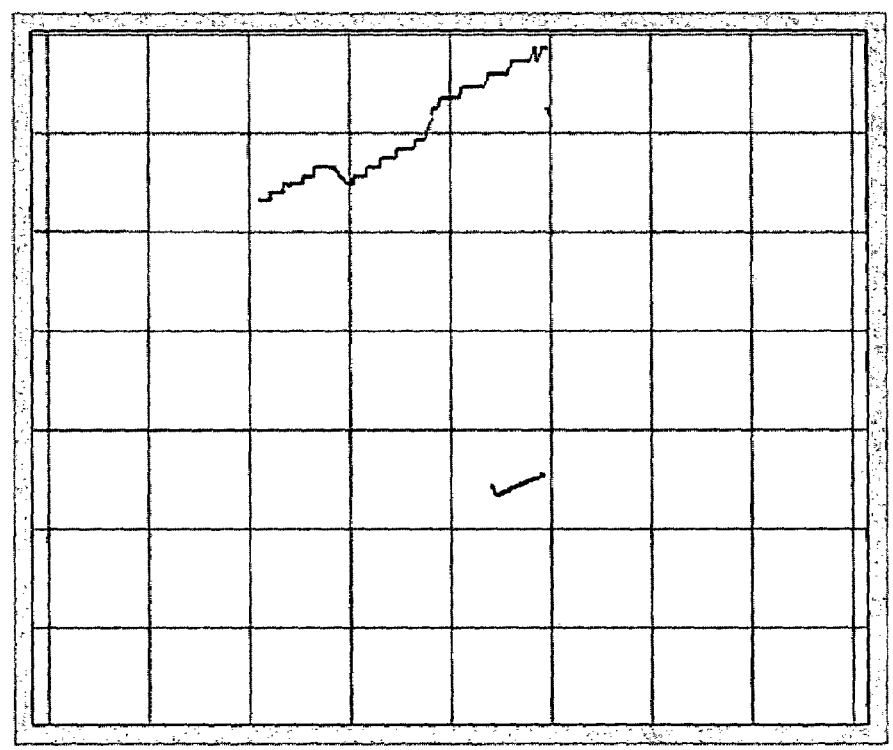
Figure 8C:
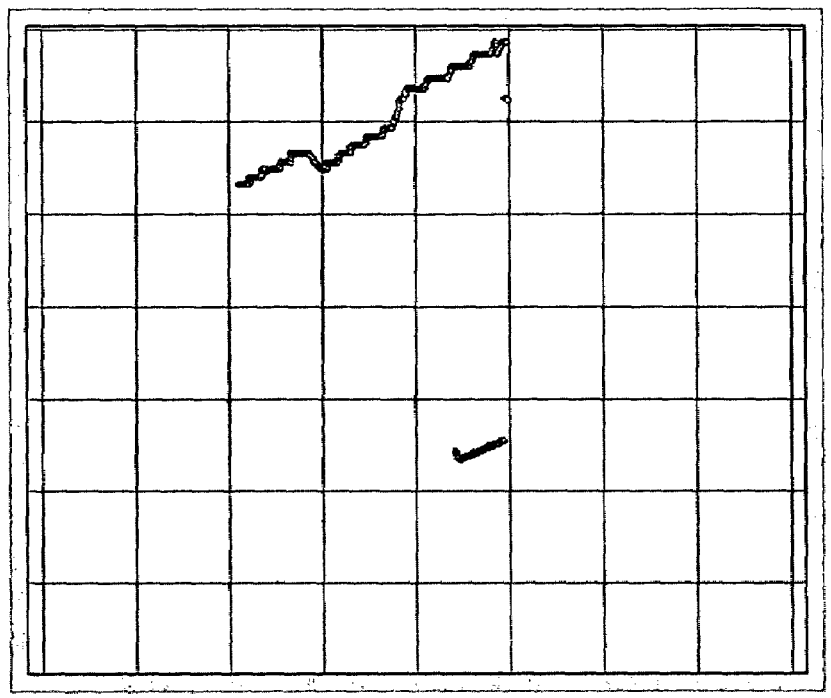
Figure 8D:
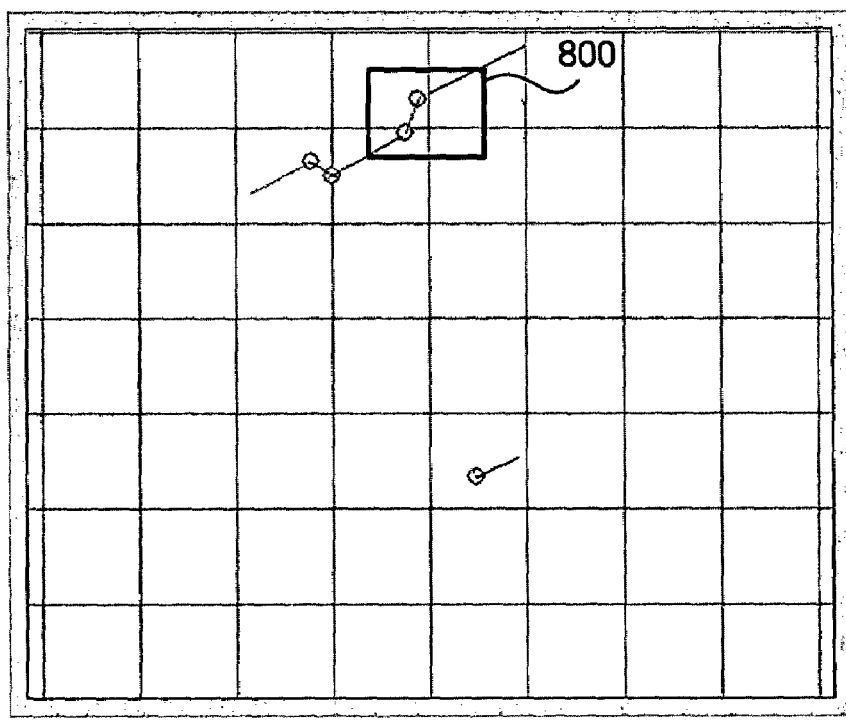

FIG. 8a shows the result of obtaining distance data. FIG. 8b shows the result of grouping points in an image into two groups. FIG. 8c shows the result of performing split-merge. FIG. 8d illustrates that a corner point is extracted in an area 800 as the result of the procedure. When the graph shown in FIG. 8d is compared with the graph shown in FIG. 2C, it is concluded that a corner point cannot be extracted if the threshold is determined according to the conventional technology but a corner point can be exactly extracted if the present invention is used.

Figure 9A:
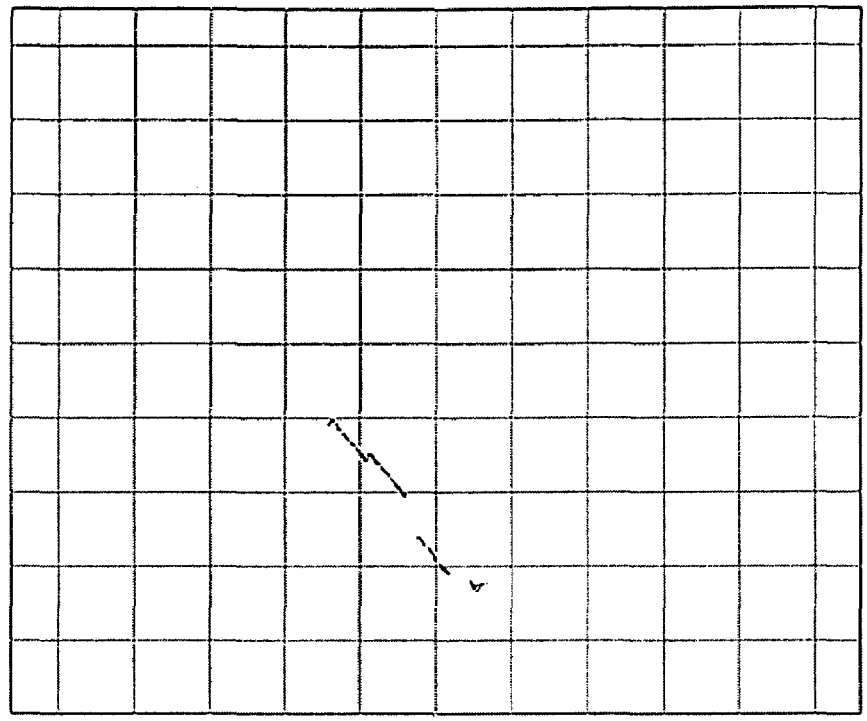
FIGS. 9a and 9b are graphs showing an example of comparison of the results of extracting a corner point between the conventional technology and the present invention.
Figure 9B:
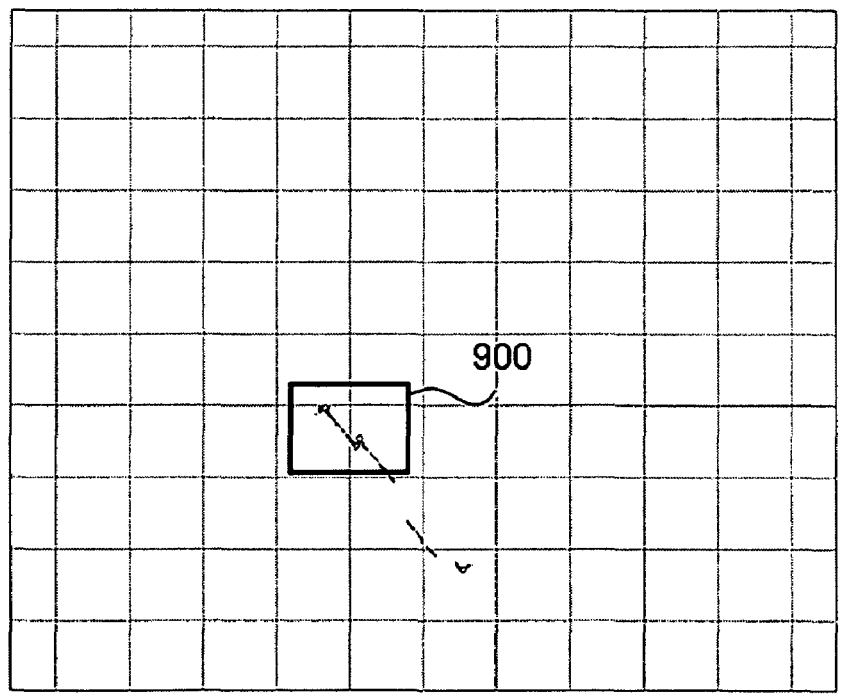

FIGS. 9a and 9b are graphs showing an example of comparison of the results of extracting a corner point between the conventional technology and the present invention. FIG. 9a shows the result of extracting a corner point using a threshold determined according to the conventional technology. FIG. 9b shows the result of extracting a corner point using a threshold determined according to an embodiment of the present invention, in which the corner point is extracted in an area 900.

Figure 10A:
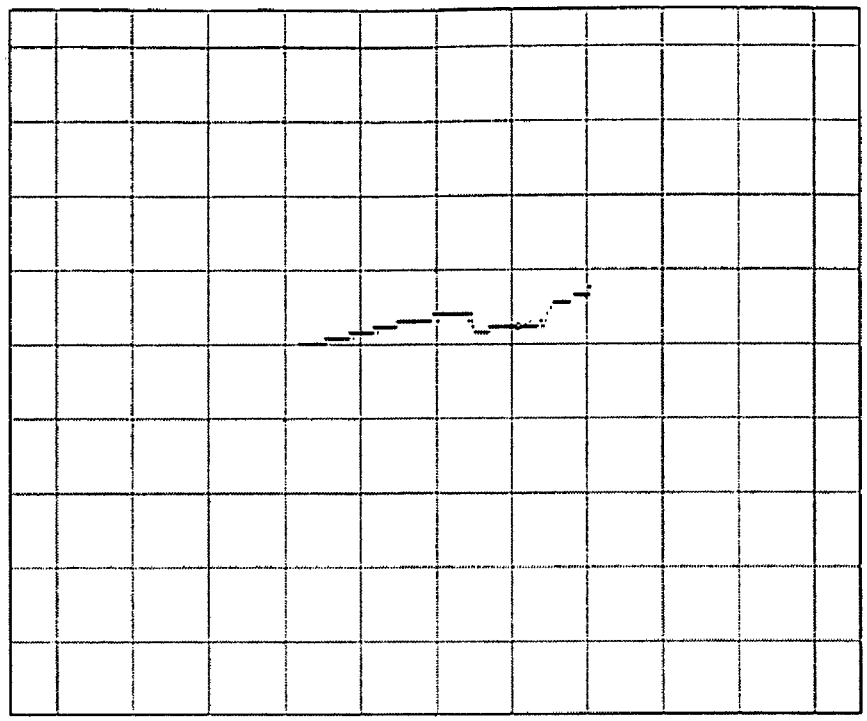
FIGS. 10a and 10b are graphs showing another example of comparison of the results of extracting a corner point between the conventional technology and the present invention.
Figure 10B:
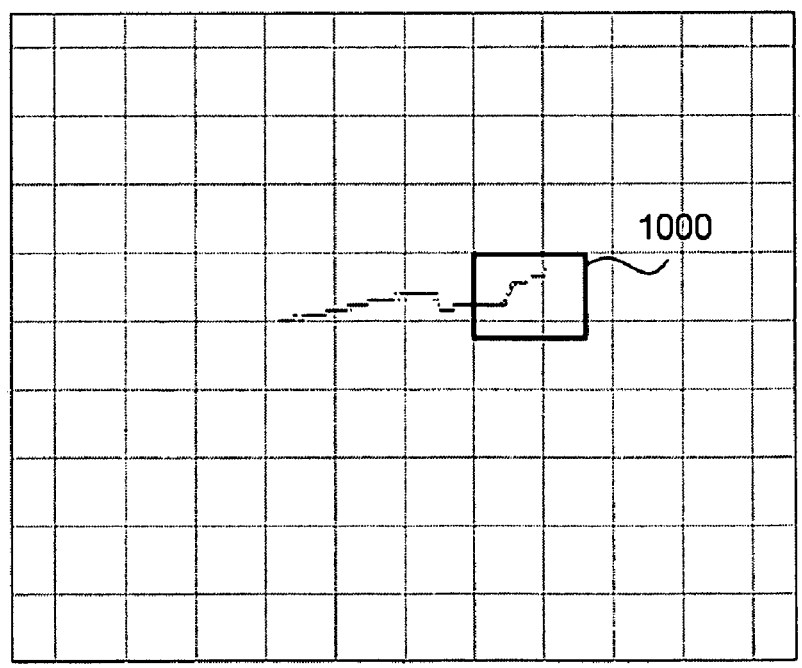

FIGS. 10a and 10b are graphs showing another example of comparison of the results of extracting a corner point between the conventional technology and the present invention.

FIG. 10a shows the result of extracting a corner point using a threshold determined according to the conventional technology. FIG. 10b shows the result of extracting a corner point using a threshold determined according to an embodiment of the present invention, in which the corner point is extracted in an area 1000.

Figure 11A:
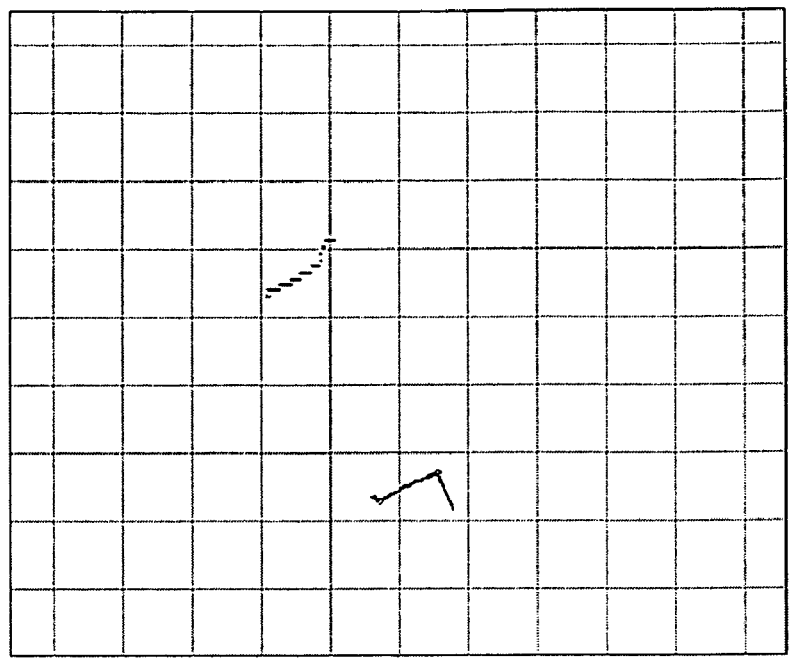
FIGS. 11a and 11b are graphs showing still another example of comparison of the results of extracting a corner point between the conventional technology and the present invention.
Figure 11B:
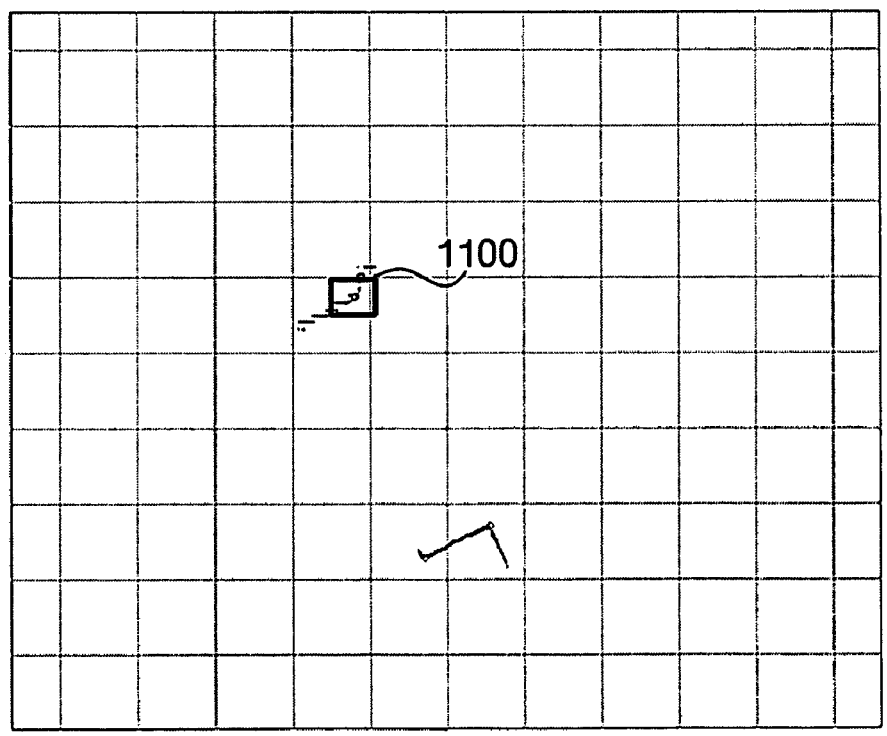

FIGS. 11a and 11b are graphs showing still another example of comparison of the results of extracting a corner point between the conventional technology and the present invention.

FIG. 11a shows the result of extracting a corner point using a threshold determined according to the conventional technology. FIG. 11b shows the result of extracting a corner point using a threshold determined according to an embodiment of the present invention, in which the corner point is extracted in an area 1100.

Figure 12:
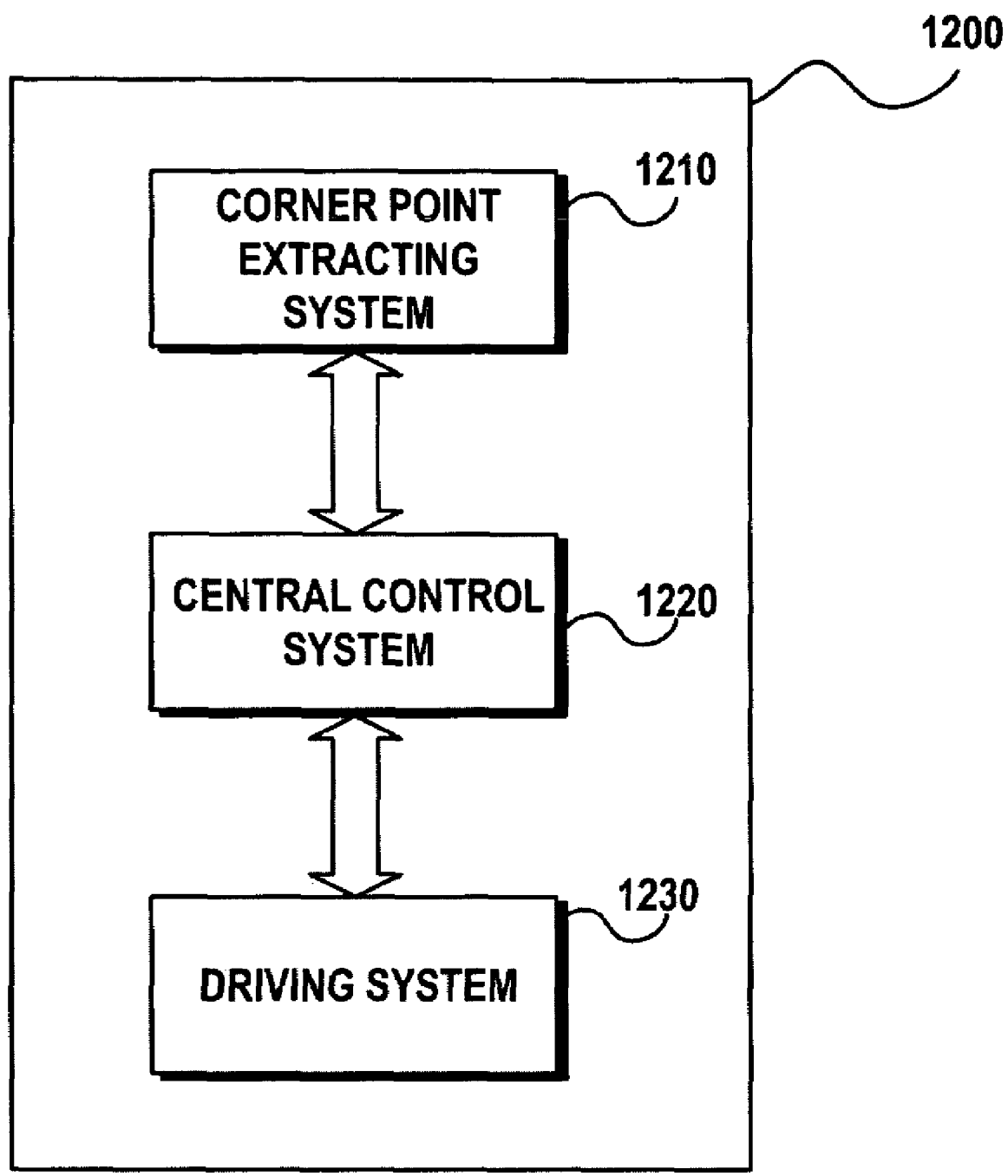
FIG. 12 is a block diagram of a mobile robot including a system for extracting a corner point, according to an embodiment of the present invention.

FIG. 12 is a block diagram of a mobile robot 1200 including a system for extracting a corner point, according to an embodiment of the present invention.

The mobile robot 1200 includes a corner point extracting system 1210, a central control system 1220, and a driving system 1230.

The corner point extracting system 1210 corresponds to the system 400 shown in FIG. 4. As described with reference to FIG. 4, the corner point extracting system 1210 acquires an image of a reflector by emitting light to the reflector in a plane form and receiving the reflected light and extracts a corner point using pixel information of the acquired image.

Information on the corner point extracted by the corner point extracting system 1210 is transmitted to the central control system 1220. The central control system 1220 determines a moving direction and speed of the mobile robot 120 based on the information.

Thereafter, the central control system 1220 transmits the moving direction and speed to the driving system 1230. Then, the driving system 1230 moves the mobile robot 1200 according to the received moving direction and speed.

As described above, the present invention enables a corner point to be exactly extracted in space by using pixel information of an image acquired by a camera.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A corner point extracting system comprising:
a light generator emitting light in a predetermined form;
an image acquisition device acquiring an image of a reflector reflecting the light emitted from the light generator; and
a control module obtaining pixel information of the acquired image and obtaining distance data between the light generator and the reflector using the pixel information of the acquired image and a geometrical relationship among the light generator, the reflector and the image acquisition device and obtaining a corner point by performing split-merge using a threshold proportional to the distance data, the distance data representing coordinate values of points on a plane obtained when the light generator and the reflector are viewed from above, the points being converted from pixels in the acquired image,
wherein the threshold is a value proportional to the distance data which corresponds to the pixel information obtained from the image acquisition device,
wherein split-merge is performed by connecting a line between two end points of the distance data, measuring distances between the line and each of the distance data points, performing a split of the line if the measured distance exceeds a predetermined threshold to create additional lines, continuously performing the splitting of the line to produce continuous lines until no measured distance exceeds the predetermined threshold and thereafter creating a common line to the continuous lines to merge the continuous lines.

2. The corner point extracting system of claim 1, wherein the light is laser light.

3. The corner point extracting system of claim 1, wherein the threshold is the value proportional to the distance data, the distance data corresponding to a 1 pixel distance in the image acquisition module.

4. The corner point extracting system of claim 1, wherein the threshold is proportional to $|F(x_s, y_s)-F(x_s, y_s+1)|$, where $x_s$ and $y_s$ indicate random coordinates in the acquired image, $y_s+1$ is a coordinate shifted from the position $y_s$ by 1 pixel in a y-direction, and $F(a, b)$ is a coordinate value on a new plane, into which a coordinate value is converted using the triangulation, the coordinate value being represented by $[a\ b]^T$.

5. The corner point extracting system of claim 1, wherein the control module obtains the distance data using coordinates of the acquired image in a triangulation.

6. A method of extracting a corner point, comprising:
emitting light to a reflector in a predetermined form from a light generator;
acquiring an image of the reflector reflecting the light from an image acquiring device and obtaining pixel information of the acquired image;
obtaining distance data between a light emission point and the reflector using the pixel information of the acquired image and a geometrical relationship among the light generator, the reflector and the image acquiring device, the distance data representing coordinate values of points on a plane obtained when the light generator and the reflector are viewed from above, the points being converted from pixels in the acquired image; and
obtaining a corner point by performing split-merge based on a threshold proportional to the distance data,
wherein the threshold is a value proportional to the distance data which corresponds to the pixel information of the acquired image,
wherein split-merge is performed by connecting a line between two end points of the distance data, measuring distances between the line and each of the distance data points, performing a split of the line if the measured distance exceeds a predetermined threshold to create additional lines, continuously performing the splitting of the line to produce continuous lines until no measured distance exceeds the predetermined threshold and thereafter creating a common line to the continuous lines to merge the continuous lines.

7. The method of claim 6, wherein the light is laser light.

8. The method of claim 6, wherein the threshold is the value proportional to the distance data, the distance data corresponding to a 1 pixel distance in the image acquisition module.

9. The method of claim 6, wherein the threshold is proportional to $|F(x_s, y_s)-F(x_s, y_s+1)|$, where $x_s$ and $y_s$ indicate random coordinates in the acquired image, $y_s+1$ is a coordinate shifted from the position $y_s$ by 1 pixel in a y-direction, and $F(a, b)$ is a coordinate value on a new plane, into which a coordinate value is converted using the triangulation, the coordinate value being represented by $[a\ b]^T$.

10. The method of claim 6, wherein the obtaining of the distance data includes obtaining the distance data using coordinates of the acquired image in a triangulation.

11. A mobile robot, comprising:
a corner point obtaining system acquiring an image of a reflector which reflects light emitted thereto in a predetermined form and obtaining a corner point using pixel information of the acquired image, the corner point being obtained by performing split-merge based on a threshold proportional to distance data that corresponds to the pixel information of the acquired image, the distance data being obtained between a light emission point and the reflector using the pixel information of the acquired image and a geometrical relationship among a light generation module, the reflector and an image acquisition module and representing coordinate values of points on a plane obtained when the light generator and the reflector are viewed from above, the points being converted from pixels in the acquired image;

a central control system determining a moving direction and speed of the mobile robot based on a position of the extracted corner point; and a driving system moving the mobile robot according to the moving direction and speed determined by the central control system, wherein split-merge is performed by connecting a line between two end points of the distance data, measuring distances between the line and each of the distance data points, performing a split of the line if the measured distance exceeds a predetermined threshold to create additional lines, continuously performing the splitting of the line to produce continuous lines until no measured distance exceeds the predetermined threshold and thereafter creating a common line to the continuous lines to merge the continuous lines.

12. The mobile robot of claim 11, wherein the corner point extracting system comprises:

the light generation module emitting the light in the plane form;

the image acquisition module acquiring the image of the reflector reflecting the light emitted from the light generation module; and a control module obtaining the distance data between the light generation module and the reflector using the acquired image and extracting the corner point by performing the split-merge using the threshold proportional to the distance data.

13. The mobile robot of claim 12, wherein the light is laser light.

14. The mobile robot of claim 12, wherein the threshold is the value proportional to the distance data, the distance data corresponding to a 1 pixel distance in the image acquisition module.

15. The mobile robot of claim 12, wherein the threshold is proportional to $|F(x_s, y_s)-F(x_s, y_s+1)|$, where $x_s$ and $y_s$ indicate random coordinates in the acquired image, $y_s+1$ is a coordinate shifted from the position $y_s$ by 1 pixel in a y-direction, and $F(a, b)$ is a coordinate value on a new plane, into which a coordinate value is converted using the triangulation, the coordinate value being represented by $[a\ b]^T$.

16. The mobile robot of claim 12, wherein the control module obtains the distance data using coordinates of the acquired image in a triangulation.

17. The corner point extracting system of claim 1, wherein the predetermined form comprises a plane form.

18. The method of claim 6, wherein the predetermined form comprises a plane form.

19. The mobile robot of claim 11, wherein the predetermined form comprises a plane form.

* * * * *